US012658622B2

(12) United States Patent
Hsu et al.

(10) Patent No.: US 12,658,622 B2
(45) Date of Patent: Jun. 16, 2026

(54) ELECTRICAL CONNECTION DEVICE

(71) Applicant: MOLEX, LLC, Lisle, IL (US)

(72) Inventors: Hsin-Hung Hsu, New Taipei City (TW); Sheng-Wen Peng, New Taipei City (TW); Kuan-Chih Huang, Taipei City (TW)

(73) Assignee: Molex, LLC, Lisle, IL (US)

( * ) Notice: Subject to any disclaimer, the term of this patent is extended or adjusted under 35 U.S.C. 154(b) by 353 days.

(21) Appl. No.: 18/407,447

(22) Filed: Jan. 9, 2024

(65) Prior Publication Data

US 2024/0235081 A1 Jul. 11, 2024

(30) Foreign Application Priority Data

Jan. 9, 2023 (CN) ......................... 202320059180.5

(51) Int. Cl.

*H01R 12/75* (2011.01)
*H01R 12/72* (2011.01)
*H01R 13/627* (2006.01)
*H01R 13/633* (2006.01)
*H01R 43/18* (2006.01)

(52) U.S. Cl.

CPC ........... *H01R 12/75* (2013.01); *H01R 12/722* (2013.01); *H01R 13/6275* (2013.01); *H01R 13/633* (2013.01); *H01R 43/18* (2013.01)

(58) Field of Classification Search

None
See application file for complete search history.

(56) References Cited

U.S. PATENT DOCUMENTS 10,916,885 B2 * 2/2021 Yang ...................... H01R 12/79
11,515,655 B2 * 11/2022 Yang .................... H01R 13/639

FOREIGN PATENT DOCUMENTS

CN 106785613 A 5/2017
CN 212257885 U * 12/2020 ......... H01R 13/6658
CN 213753127 U * 7/2021 ............. H01R 13/64
CN 214379112 U * 10/2021

* cited by examiner

*Primary Examiner* — Tho D Ta

(57) ABSTRACT

An electrical connection device includes a cable-end connector. The cable-end connector includes an insulative housing, a circuit board, a cable and a locking member. The insulative housing has a body portion and a mating portion. The body portion is formed with a first opening, the mating portion is connected to the body portion and has a continuous surrounding wall which encircles the first opening, the continuous surrounding wall encircles to form an inner cavity, the inner cavity has a second opening. Each of two opposite sides of the body portion and the mating portion therebetween form a positioning space. The circuit board is provided to the body portion, partially extends out of the first opening and extends to the inner cavity. The cable is electrically connected to a side of the circuit board. The locking member is provided to the insulative housing. The cable-end connector can firmly mate with the board-end connector, so that stability of electrical signal transmission can be promoted.

22 Claims, 16 Drawing Sheets

ELECTRICAL CONNECTION DEVICE

RELATED APPLICATIONS

This application claims priority to Chinese Utility Application No. 202320059180.5, which was filed Jan. 9, 2023; the contents therein are incorporated by reference in its entirety.

TECHNICAL FIELD

The present disclosure relates to an electrical connection device, and particularly relates to an electrical connection device having a cable-end connector and a board-end connector which mate with each other.

BACKGROUND

A circuit board of an existing cable-end connector is partially provided in a housing and partially extends out of the housing. The housing has a fixing tongue piece which is spaced apart from the circuit board. When the cable-end connector mates with a board-end connector, the circuit board and the fixing tongue piece respectively insert into an inserting groove and a mounting groove of the board-end connector. After the cable-end connector mates with the board-end connector, when a cable of the cable-end connector is strongly pulled due to inadvertent hit, this very easily causes the cable-end connector to sway or shake relative to the board-end connector and causes electrical signal transmission to be unstable. For example, a connector is disclosed in Chinese patent document CN106785613A.

SUMMARY

Therefore, an object of the present disclosure is to provide an electrical connection device which can overcome at least one deficiency of prior art.

Accordingly, an electrical connection device of the present disclosure comprises a cable-end connector. The cable-end connector comprises an insulative housing, a circuit board, at least one cable and a locking member. The insulative housing has a body portion and a mating portion. The body portion is formed with a first opening, the mating portion is connected to the body portion and has a continuous surrounding wall which encircles the first opening, the continuous surrounding wall encircles to form an inner cavity, the inner cavity has a second opening. Each of two opposite sides of the body portion and the mating portion therebetween form a positioning space. The circuit board is provided to the body portion, partially extends out of the first opening and extends to the inner cavity. The cable is electrically connected to a side of the circuit board. The locking member is provided to the insulative housing.

In some embodiments, the positioning space is a positioning groove, a front end and a bottom end of the positioning groove are opened, a rear end and a top end of the positioning groove are closed.

In some embodiments, the continuous surrounding wall has a front wall body, the insulative housing further has two protruding portions which extend forwardly from the front wall body and are respectively adjacent to two opposite sides of the continuous surrounding wall.

In some embodiments, each protruding portion is formed with an opened groove which is communicated with the inner cavity and extends to the second opening.

In some embodiments, each protruding portion is a solid structure.

In some embodiments, the front wall body formed with two recessed portions which extend toward the body portion, each recessed portion is interposed between the corresponding protruding portion and the locking member.

In some embodiments, the insulative housing is formed with two receiving spaces which extend from the front wall body to the body portion, the two receiving spaces are respectively communicated with outer sides of the two recessed portions.

In some embodiments, each recessed portion has a first extending length, each receiving space has a second extending length, the second extending length is larger than the first extending length.

In some embodiments, the cable-end connector further comprises a cladding body which is positioned in the insulative housing, the cladding body clads a region where the circuit board and the cable are connected with each other.

In some embodiments, the cable-end connector comprises a plurality of cables which are electrically connected to two opposite sides of the circuit board respectively, the insulative housing is formed with an injecting hole, the cladding body is formed by that a plastic is injected into the insulative housing via the injecting hole and is filled in the insulative housing.

In some embodiments, the insulative housing is formed with a molding cavity which receives the cladding body and is communicated with the injecting hole and a retaining hole which is communicated with the molding cavity, the cable-end connector further comprises a retaining member, the retaining member is partially provided in the retaining hole, partially extends into the molding cavity and is securely engaged with the cladding body.

In some embodiments, the insulative housing formed with a retaining groove, the locking member has a retaining segment which is provided to the retaining groove, a locking segment which extends out from the retaining segment and is spaced apart from the insulative housing, and an actuating segment which extends out from the locking segment.

In some embodiments, the cable-end connector further comprises a pulling strap, the pulling strap has a connecting strap body which is connected to the actuating segment of the locking member and a grasping strap body.

In some embodiments, the electrical connection device further comprises a board-end connector, the board-end connector comprises an insulative base, a plurality of terminals and a metal shell, the insulative base has an annular circumferential wall which is used to insert into the inner cavity, the annular circumferential wall is formed with an inserting groove which is used to allow the circuit board to insert therein, each terminal is provided to the insulative base and has a contact portion which extends into the inserting groove and is used to be electrically connected with the circuit board, the metal shell sheathes the insulative base, is used to allow the locking member to lock therewith and is used to insert into the corresponding positioning space, the metal shell and the insulative base together define a mating groove which encircles the annular circumferential wall and is used to allow the continuous surrounding wall to insert therein.

In some embodiments, a top portion of the metal shell has a protruding piece, the protruding piece is U-shaped and has a long piece body and two short piece bodies which are respectively connected to opposite sides of the long piece body, each short piece body is used to insert into the corresponding positioning space.

In some embodiments, the electrical connection device further comprises a board-end connector, the board-end connector comprises an insulative base, a plurality of terminals and a metal shell, the insulative base formed with an inserting groove which is used to allow the circuit board to insert therein, each terminal is provided to the insulative base and has a contact portion which extends into the inserting groove and is used to be electrically connected with the circuit board, the metal shell sheathes the insulative base and is used to allow the locking member to lock therewith, a top portion of the metal shell has a protruding piece, the protruding piece is U-shaped and has a long piece body and two short piece bodies which are respectively connected to opposite sides of the long piece body, each short piece body is used to insert into the corresponding positioning space.

In some embodiments, the insulative base has a base body which partially extends out of the metal shell, the base body is formed with a retaining groove, a bottom portion of the metal shell has a retaining piece which snaps into the retaining groove of the base body.

In some embodiments, the protruding piece further has at least one preventing reverse insert component which extends out from the long piece body, when the cable-end connector reversely inserts into the board-end connector, the preventing reverse insert component of the board-end connector will stop and push away the continuous surrounding wall of the mating portion, so as to prevent the circuit board from inserting into the inserting groove.

In some embodiments, the preventing reverse insert component is a bent piece which bends and extends inwardly from the long piece body toward the inserting groove.

In some embodiments, the insulative housing is formed with at least one receiving space which is used to receive the preventing reverse insert component, when the cable-end connector properly inserts into the board-end connector, the preventing reverse insert component is received in the receiving space.

In some embodiments, the protruding piece has two preventing reverse insert components which extend out from the long piece body and are spaced apart from each other, the insulative housing is formed with two receiving spaces which are respectively used to receive the two preventing reverse insert components.

In some embodiments, the insulative housing has a lower housing and an upper housing which is assembled to the lower housing, the lower housing has the body portion and the mating portion.

The present disclosure at least has the following effects: by that the continuous surrounding wall of the mating portion inserts into the mating groove and the inner cavity, which is formed by the continuous surrounding wall and has an outer circumference thereof to be closed, allows the annular circumferential wall to insert therein, an inner circumference and an outer circumference of the continuous surrounding wall are respectively stopped and limited by the annular circumferential wall and the metal shell. By that each positioning space allows the corresponding short piece body to insert therein, each short piece body can function as stopping and limiting the insulative housing. Therefore, it can prevent the insulative housing from swaying or shaking along the first direction or the second direction, so that the cable-end connector can firmly mate with the board-end connector. Even if the plurality of cables are strongly pulled due to inadvertent hit, the cable-end connector does not easily generate a situation as swaying or shaking, so that stability of electrical signal transmission can be promoted.

BRIEF DESCRIPTION OF THE DRAWINGS

Other features and effects of the present disclosure will be apparent from embodiments with reference to the drawings, in which.

Figure 1:
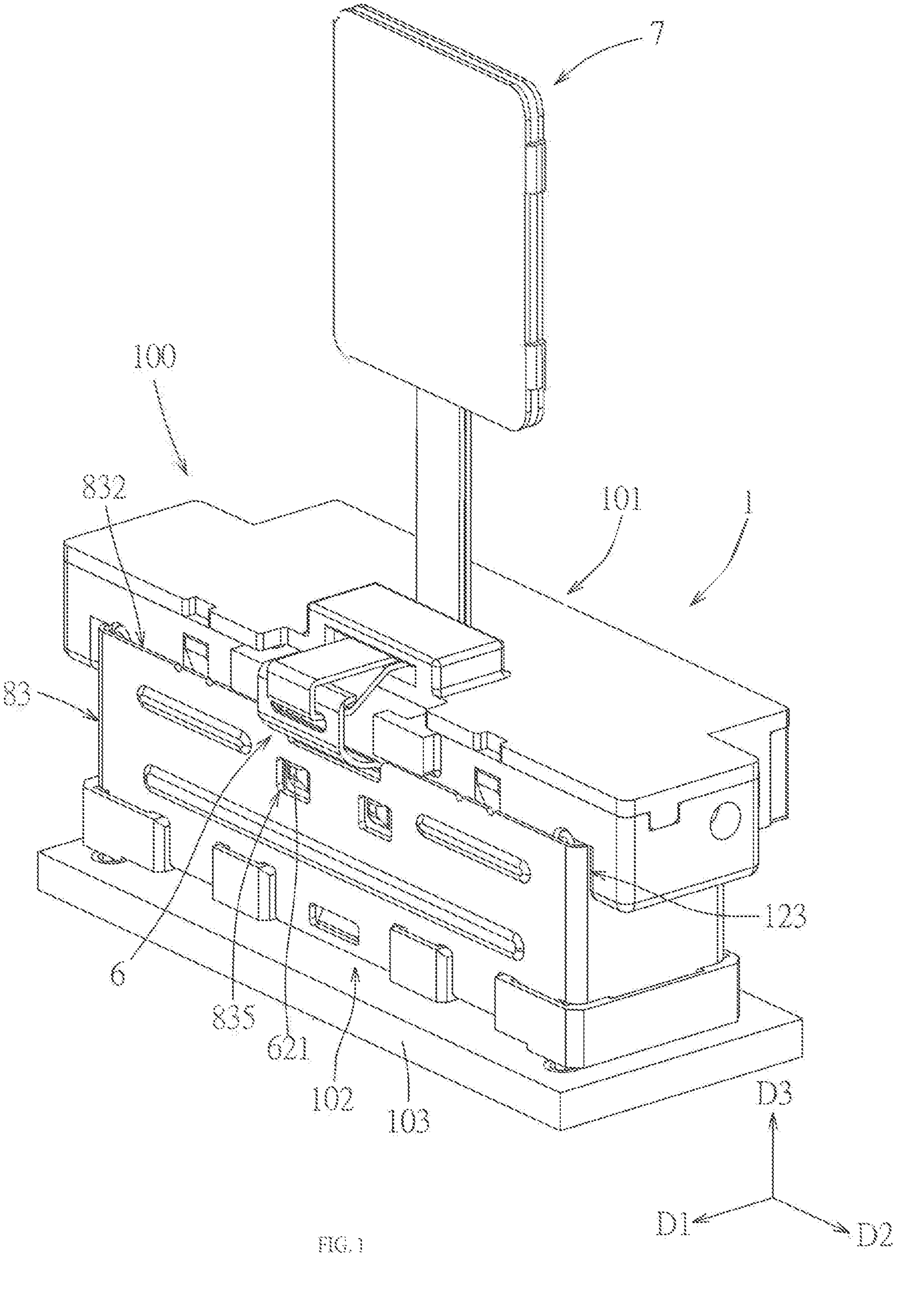
FIG. 1 is a perspective view of a first embodiment of an electrical connection device of the present disclosure provided to a circuit board.

Reference numerals are presented as follows.

100 electrical connection device
101 cable-end connector
102 board-end connector
103 circuit board
1 insulative housing
11 lower housing
110 body portion
111 mating portion
112 protruding portion
113 first opening
114 molding cavity
115 retaining hole
116 injecting hole
117 continuous surrounding wall
118 inner cavity
119 second opening
120 front wall body
121 recessed portion
122 retaining groove
123 positioning space
124 opened groove

125 receiving space
13 upper housing
131 penetrating hole
2 circuit board
3 cable
4 retaining member
5 cladding body
6 locking member
61 retaining segment
62 locking segment
621 latching block
63 actuating segment
631 connecting hole
7 pulling strap
71 connecting strap body
72 grasping strap body
81 insulative base
811 base body
812 annular circumferential wall
813 retaining groove
814 inserting groove
82 terminal module
821 terminal seat
822 terminal
823 contact portion
83 metal shell
831 retaining piece
832 protruding piece
833 long piece body
834 short piece body
835 latching hole
836 preventing reverse insert component
84 mating groove
L1 first extending length
L2 second extending length
D1 first direction
D2 second direction
D3 third direction

DETAILED DESCRIPTION

Before the present disclosure is described in detail, it is noted that the similar elements are indicated by the same reference numerals in the following description.

Figure 2:
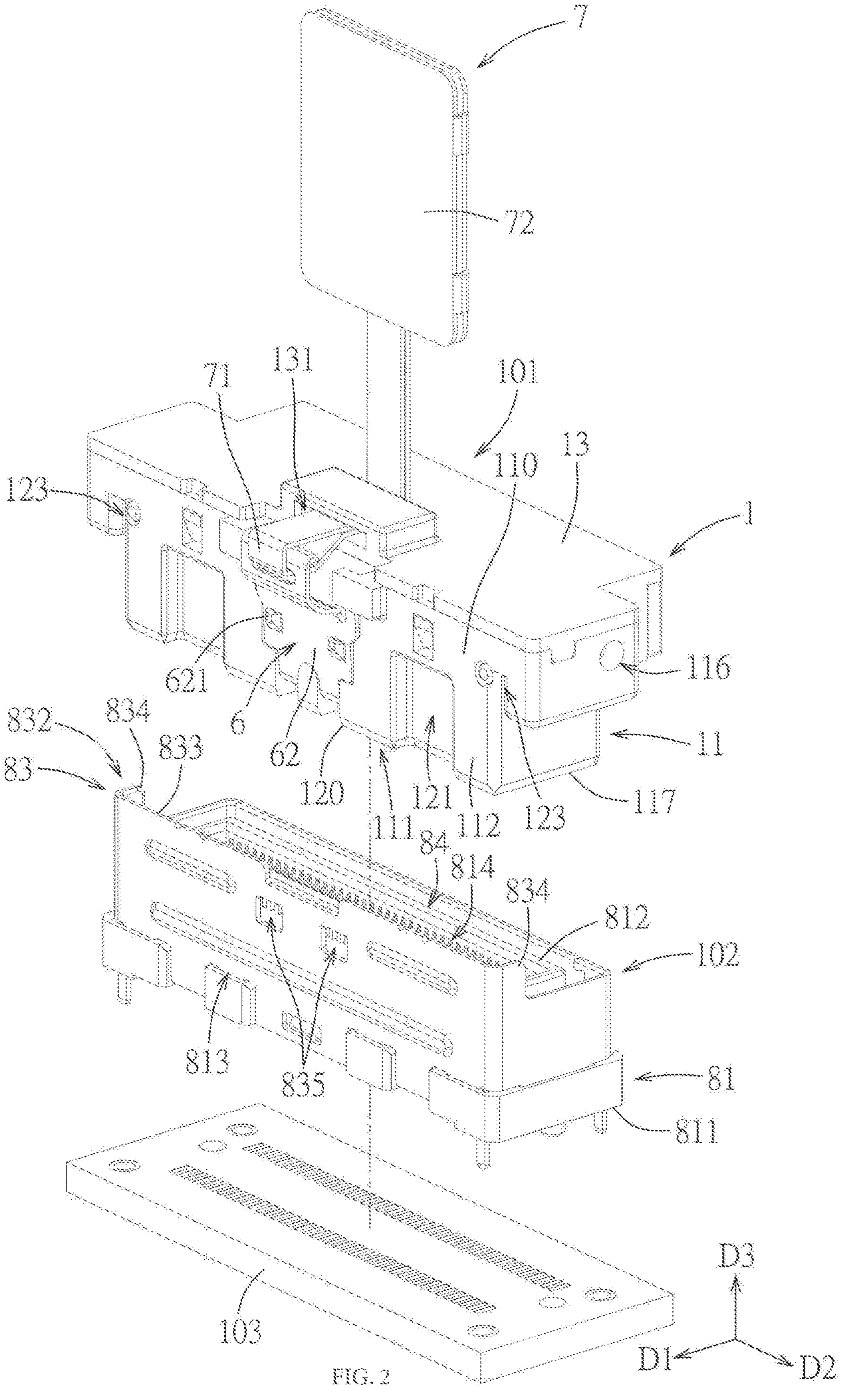
FIG. 2 is a perspective exploded view of FIG. 1 illustrating an assembling relationship among the circuit board, a cable-end connector and a board-end connector.
Figure 3:
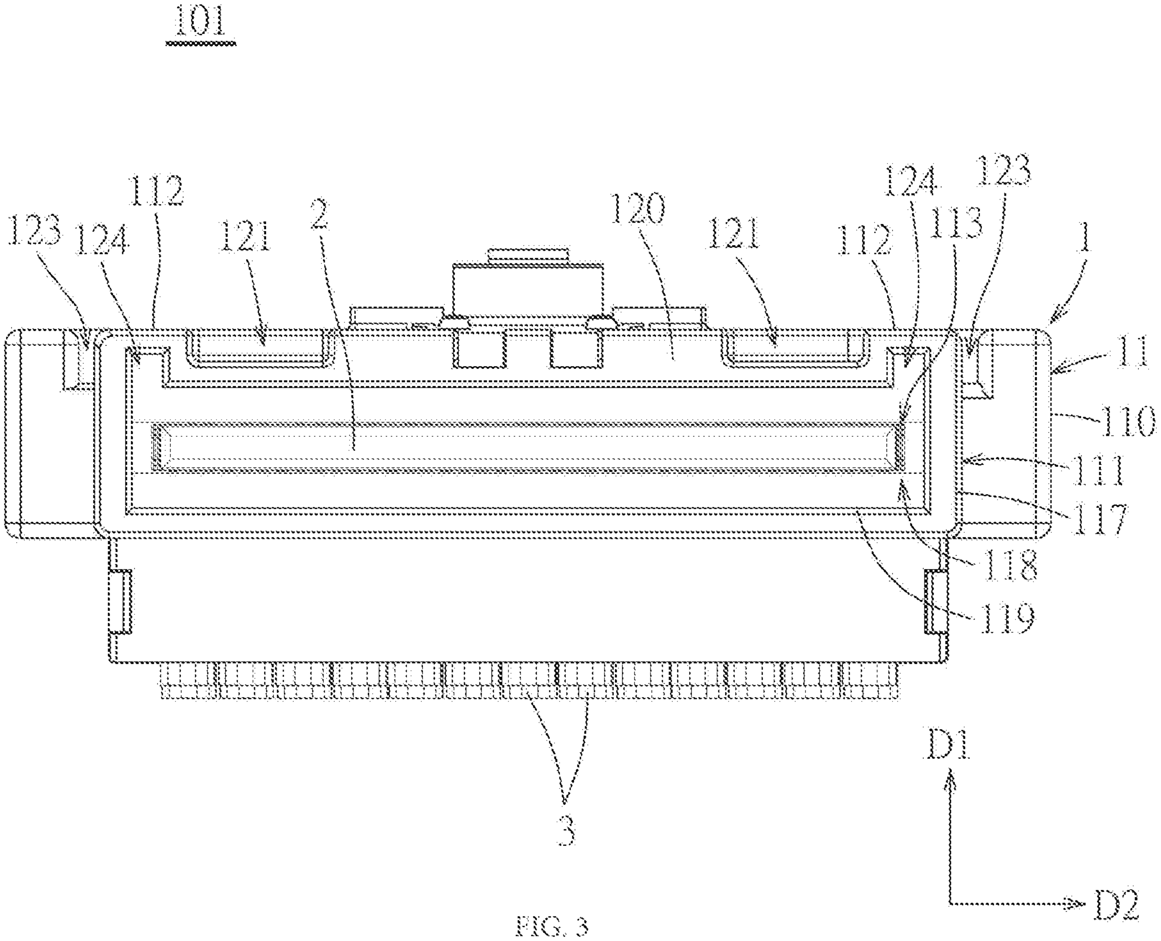
FIG. 3 is a bottom view of the cable-end connector of the first embodiment.

Referring to FIG. 1 and FIG. 2, a first embodiment of an electrical connection device 100 of the present disclosure includes a cable-end connector 101 and a board-end connector 102. The board-end connector 102 is provided to a circuit board 103 and is electrically connected with the circuit board 103. The cable-end connector 101 is used to mate with the board-end connector 102.

For sake of convenience of the later description, in the electrical connection device 100, a first direction D1, a second direction D2 perpendicular to the first direction D1 and a third direction D3 perpendicular to the first direction D1 and the second direction D2 are defined. In the first embodiment, the first direction D1 takes a front-rear direction as example, in FIG. 1, a direction to which an arrow points is front and a direction opposite to front is rear. The second direction D2 takes a left-right direction as example, in FIG. 1, a direction to which an arrow points is left and a direction opposite to left is right. The third direction D3 takes an up-down direction as example, in FIG. 1, a direction to which an arrow points is up and a direction opposite to up is down.

Referring to FIG. 3, FIG. 4, FIG. 5 and FIG. 6, the cable-end connector 101 takes a right-angle type cable-end connector for example, but also may be a vertical type cable-end connector. The cable-end connector 101 includes an insulative housing 1, a circuit board 2, a plurality of cables 3, two retaining members 4, a cladding body 5, a locking member 6 and a pulling strap 7. The insulative housing 1 is an assembled-type housing which is in form of elongated housing, a length direction of the insulative housing 1 extends along the second direction D2. The insulative housing 1 has a lower housing 11 and an upper housing 13. The lower housing 11 has a body portion 110, a mating portion 111 and two protruding portions 112. The body portion 110 is formed with a first opening 113, a molding cavity 114, two retaining holes 115 and two injecting holes 116. The molding cavity 114 is communicated with a top end of the first opening 113, a top end and a rear end of the molding cavity 114 are opened. The two retaining holes 115 are spaced apart from each other along the second direction D2 and are communicated with a front end of the molding cavity 114. The two injecting holes 116 are spaced apart from each other along the second direction D2 and are respectively communicated with a left side and a right side of the molding cavity 114, each injecting hole 116 is used to allow a plastic to be injected into the molding cavity 114 therethrough so that the plastic can be filled in the molding cavity 114.

The mating portion 111 is connected to the body portion 110 and extends downwardly from the body portion 110. The mating portion 111 has a continuous surrounding wall 117 which encircles the first opening 113. The continuous surrounding wall 117 is formed with an inner cavity 118 which is communicated with the first opening 113, the inner cavity 118 has a second opening 119 which is positioned below the first opening 113. The continuous surrounding wall 117 has a front wall body 120 which is toward the front. The front wall body 120 is formed with two recessed portions 121 which extends toward the body portion 110 and are spaced apart from each other along the second direction D2. By that the front wall body 120 is formed with the two recessed portions 121, an amount of a plastic used to mold the lower housing 11 can be saved so as to lower manufacturing cost. The body portion 110 and the front wall body 120 of the continuous surrounding wall 117 together form a retaining groove 122 which is positioned between the two recessed portions 121 and is used to allow the locking member 6 to be provided therein. Each of two opposite sides of the body portion 110 and the mating portion 111 therebetween form a positioning space 123. In the first embodiment, the positioning space 123 is a positioning groove, a front end and a bottom end of the positioning groove are opened, a rear end and a top end of the positioning groove are closed.

The two protruding portions 112 extend forwardly from the front wall body 120 of the continuous surrounding wall 117 and are respectively adjacent to two opposite sides of the continuous surrounding wall 117. Each protruding portion 112 is formed with an opened groove 124 which is communicated with the inner cavity 118 and extends to the second opening 119. By that each protruding portion 112 is formed with the opened groove 124, the amount of the plastic used to mold the lower housing 11 can be saved so as to lower manufacturing cost. Each recessed portion 121 is interposed between the retaining groove 122 and the corresponding protruding portion 112.

The upper housing 13 is assembled to the lower housing 11 and closes the top end of the molding cavity 114. The upper housing 13 and the lower housing 11 are securely engaged together by a latching manner that a latching hook and a latching groove cooperate with each other. The upper housing 13 is formed with a penetrating hole 131.

Referring to FIG. 3, FIG. 4, FIG. 6 and FIG. 7, the circuit board 2 is partially provided to the molding cavity 114 and the first opening 113 of the body portion 110, the circuit board 2 partially extends out of the first opening 113 and extends to the inner cavity 118. The plurality of cables 3 are respectively electrically connected to a front side and a rear side of the circuit board 2.

Figure 4:
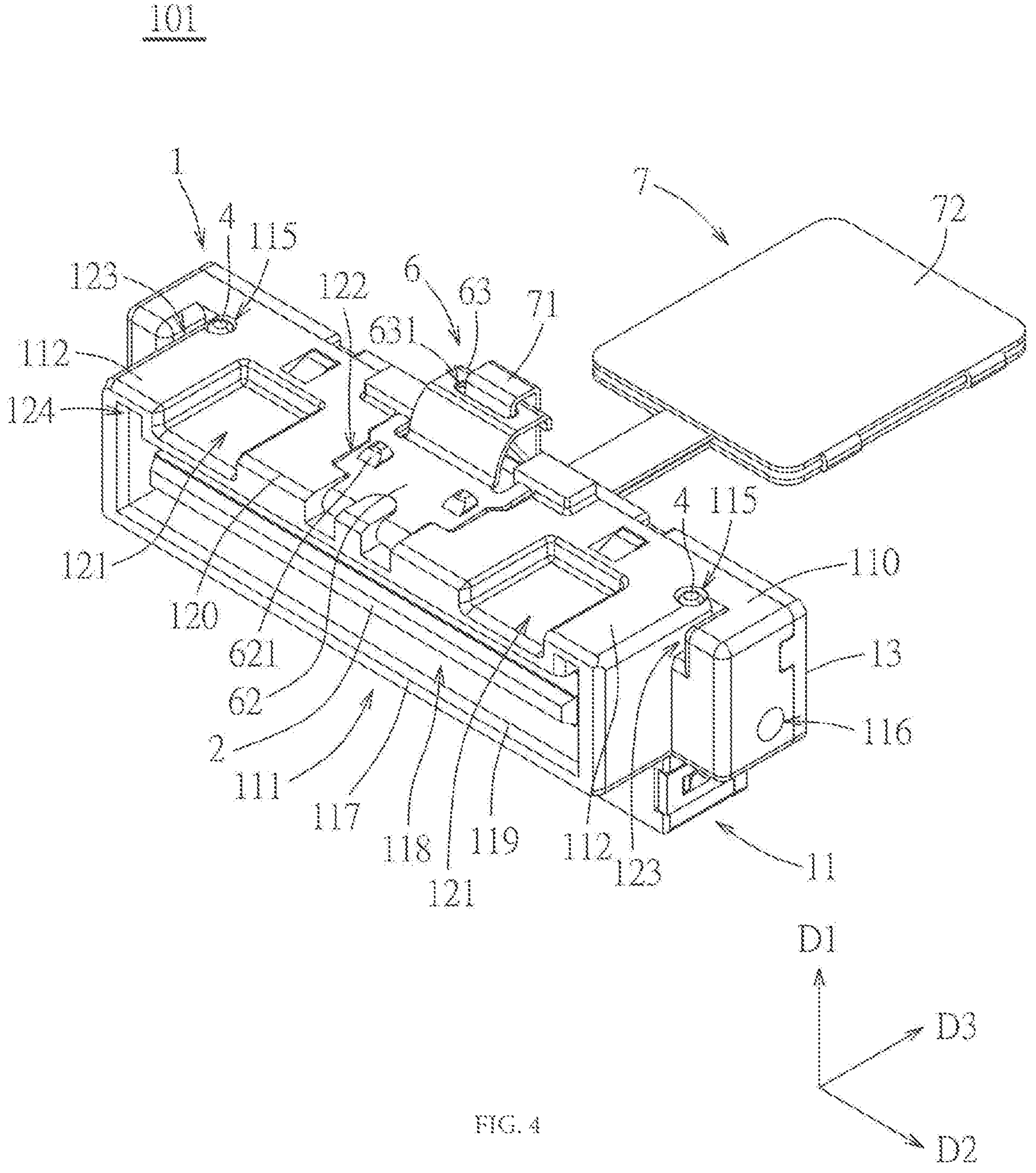
FIG. 4 is a perspective view of the cable-end connector of the first embodiment.
Figure 5:
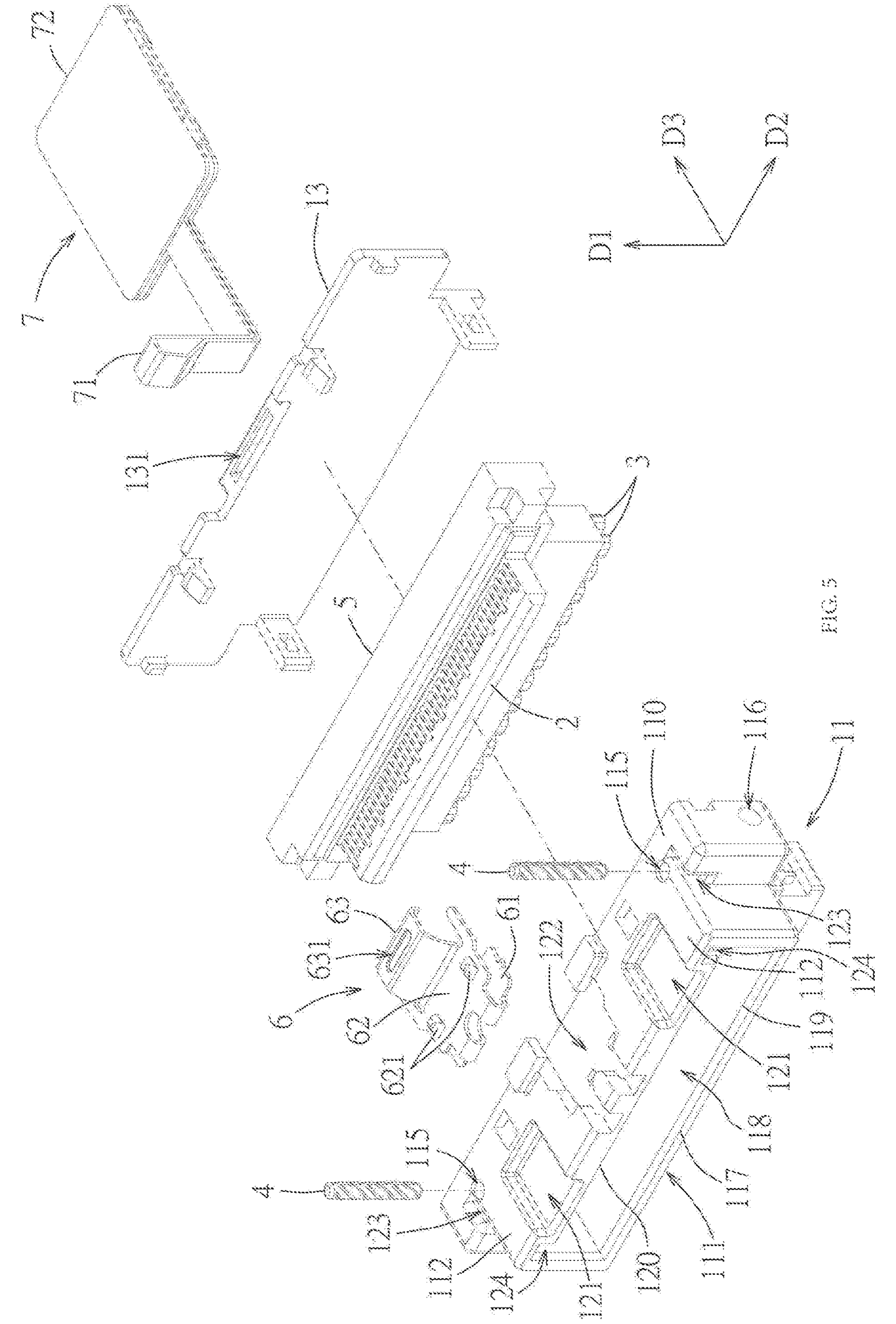
FIG. 5 is a perspective exploded view of the cable-end connector of the first embodiment.
Figure 6:
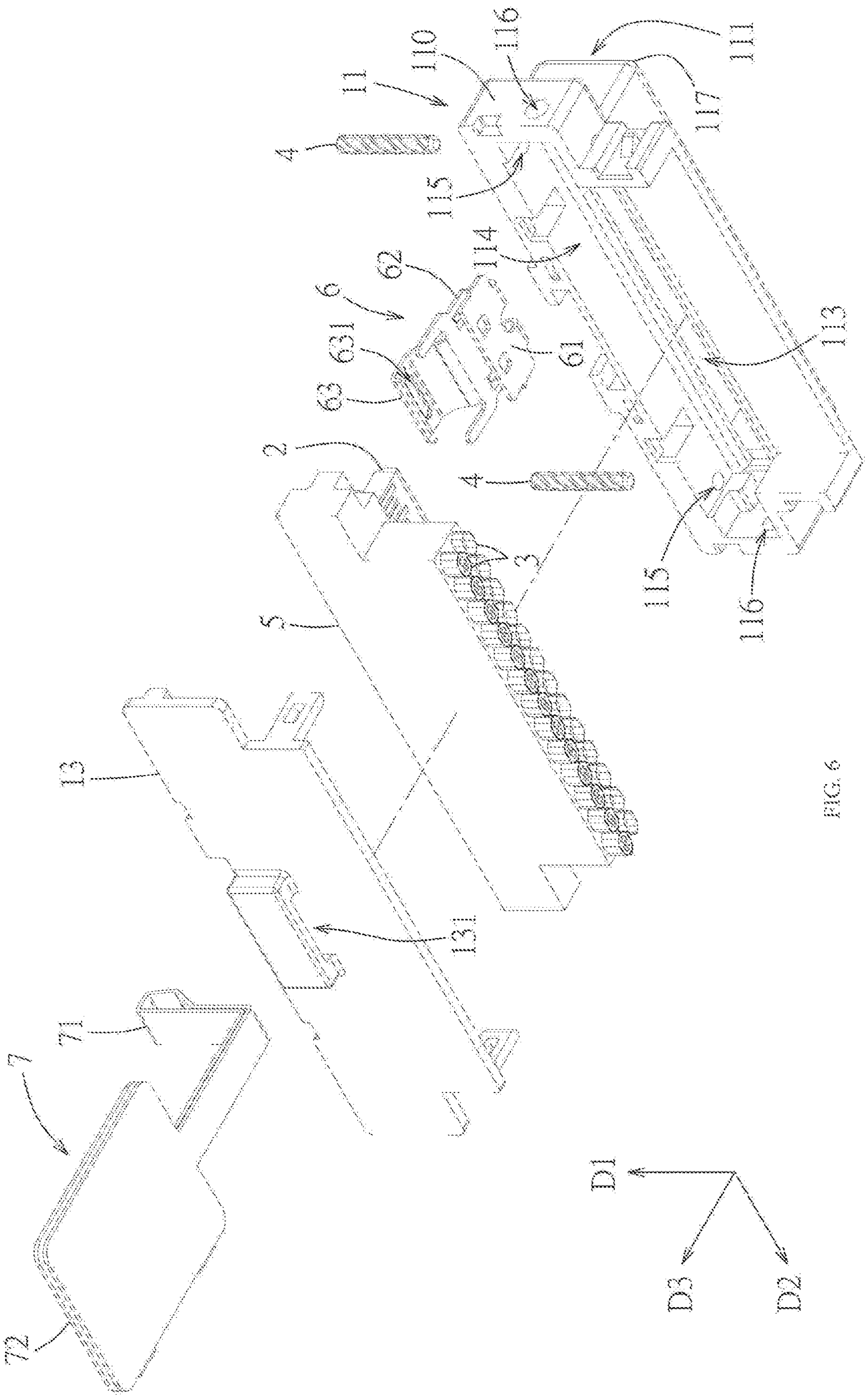
FIG. 6 is a perspective exploded view of the cable-end connector of the first embodiment viewed from another angle.
Figure 7:
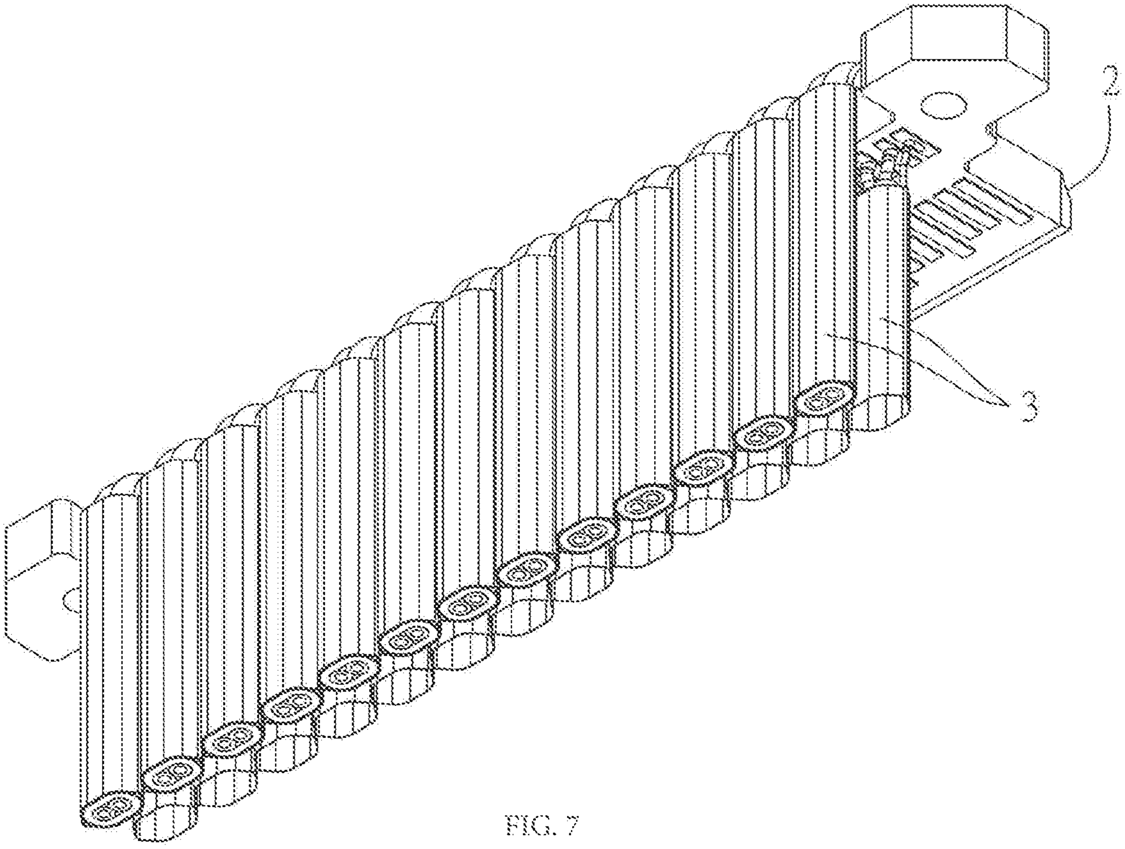
FIG. 7 is a partial perspective view of the cable-end connector of the first embodiment illustrating a connecting relationship between a circuit board and a plurality of cables.

Referring to FIG. 4, FIG. 5 and FIG. 6, each retaining member 4 is a cylinder which is formed with a screw thread on an outer circumferential surface thereof. Each retaining member 4 is partially provided in the corresponding retaining hole 115 and partially extends into the molding cavity 114. The cladding body 5 is positioned in the molding cavity 114, clads a region where the circuit board 2 and the plurality of cables 3 are connected with each other, and is used to prevent the region where the circuit board 2 and the plurality of cables 3 are electrically connected with each other from exposing outside and protect the region where the circuit board 2 and the plurality of cables 3 are electrically connected with each other. In the first embodiment, the cladding body 5 is formed by that the plastic is injected into the molding cavity 114 via the two injecting holes 116 and is filled in the molding cavity 114. The plastic clads the two retaining members 4 while the plastic is filled in the molding cavity 114, so that the cladding body 5 can be securely engaged with the two retaining members 4 when the plastic is cured and forms the cladding body 5, so that firmness of the cladding body 5 which is fixed in the molding cavity 114 can be promoted.

It is noted that, in other implementing manners of the first embodiment, the plurality of cables 3 also may be reduced in number as desired and are only electrically connected to the same side of the circuit board 2, or the plurality of cables 3 also may be set as one in number as desired and is electrically connected to one side of the circuit board 2, and are not limited to the manner disclosed in the first embodiment. Moreover, the number of the retaining hole 115 and the number of the retaining member 4 also may be set that the number is one or two or more as desired, and is not limited to two.

The locking member 6 has a retaining segment 61, a locking segment 62 and an actuating segment 63. The retaining segment 61 is provided in the retaining groove 122 of the insulative housing 1, a left side and a right side of the retaining segment 61 snap to the insulative housing 1 by for example interfering cooperation. The locking segment 62 extends upwardly from the retaining segment 61 and is spaced apart from the insulative housing 1. The locking segment 62 is capable of bending relative to the retaining segment 61 and has two latching blocks 621 which are spaced apart from each other along the second direction D2. The actuating segment 63 extends upwardly from a top portion of the locking segment 62 and is formed with a connecting hole 631. By that the locking segment 62 is capable of bending relative to the retaining segment 61 to be away from or close to the insulative housing 1, the locking member 6 is capable of converting between a locking state and a locking-released state.

The pulling strap 7 has a connecting strap body 71 and a grasping strap body 72. The connecting strap body 71 is partially provided in the connecting hole 631 of the locking member 6 and is connected to the actuating segment 63. The connecting strap body 71 is partially provided in the penetrating hole 131 of the upper housing 13 and partially extends out of a top end of the upper housing 13. The grasping strap body 72 is formed to a top end of the connecting strap body 71, and is used to allow a user to grasp and pull. When the user pulls the pulling strap 7 upwardly via the grasping strap body 72, the connecting strap body 71 will pull the actuating segment 63 to make the actuating segment 63 actuate the locking segment 62 to bend relative to the retaining segment 61, so that the locking member 6 converts to the locking-released state from the locking state.

Figure 8:
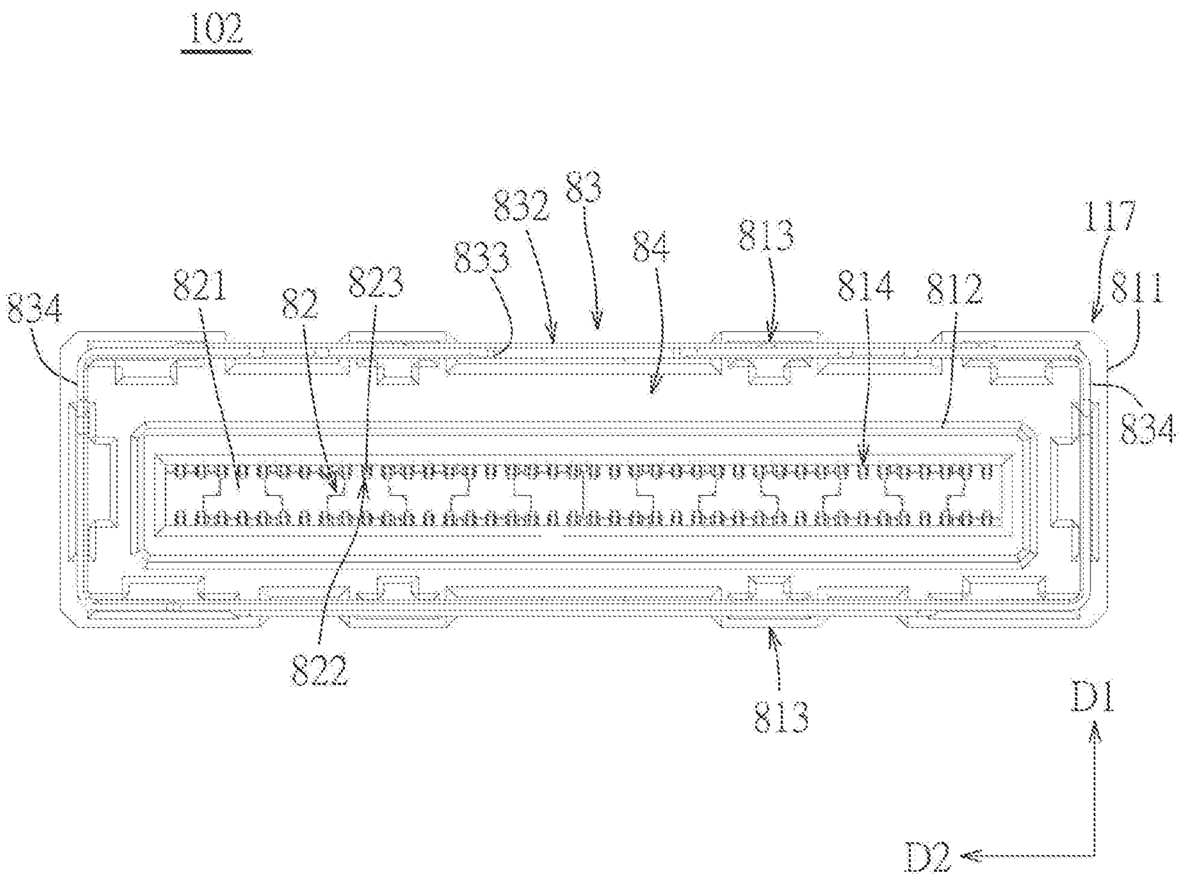
FIG. 8 is a top view of the board-end connector of the first embodiment.
Figure 9:
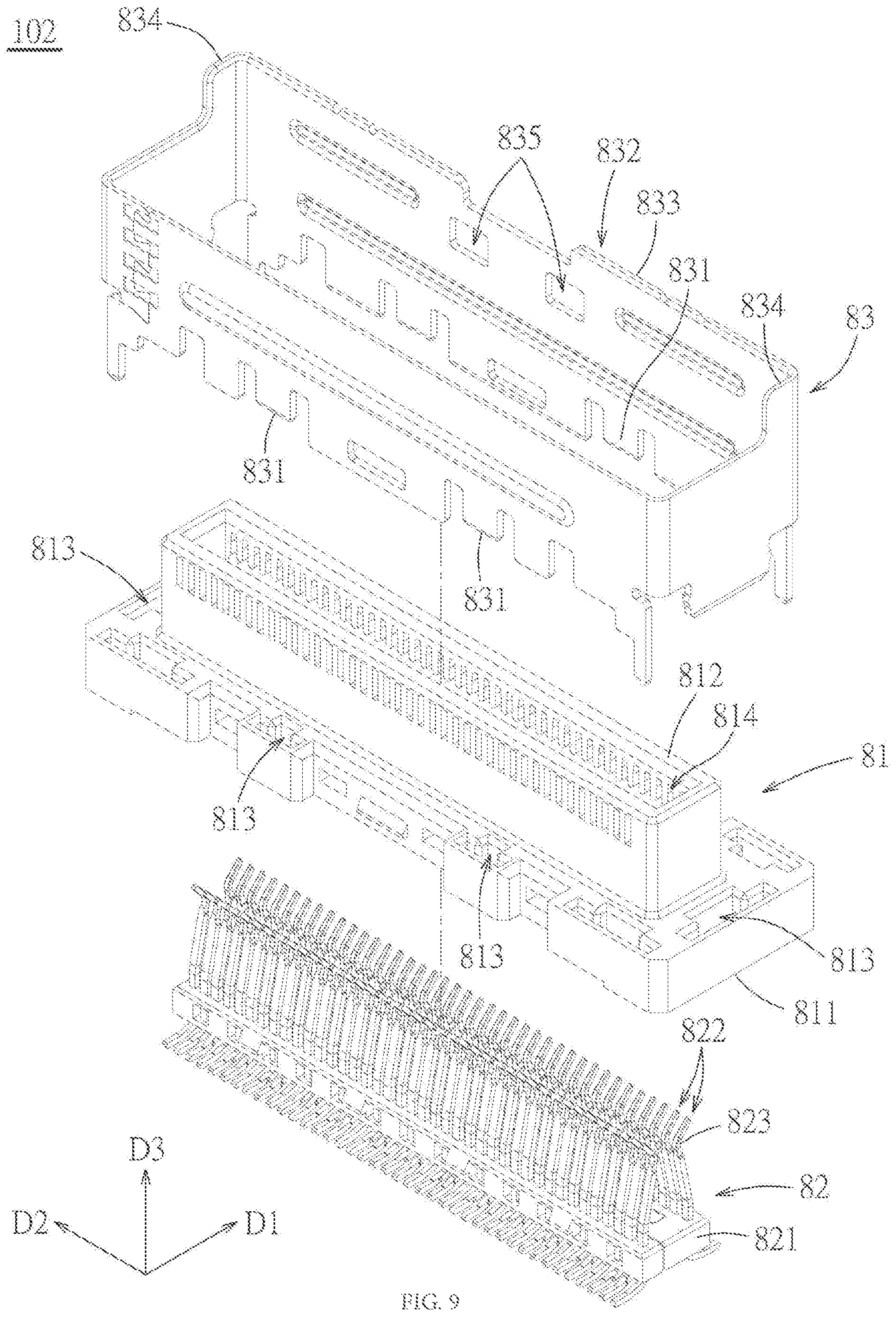
FIG. 9 is a perspective exploded view of the board-end connector of the first embodiment.

Referring to FIG. 2, FIG. 8 and FIG. 9, the board-end connector 102 includes an insulative base 81, a terminal module 82 and a metal shell 83. The insulative base 81 has a base body 811 and an annular circumferential wall 812. The annular circumferential wall 812 protrudes upwardly from the base body 811 and is spaced apart from an outer circumferential edge of the base body 811 by a certain distance. The base body 811 is formed with a plurality of retaining grooves 813 which encircle the annular circumferential wall 812. The annular circumferential wall 812 is formed with an inserting groove 814 which is used to allow the circuit board 2 to insert therein. The terminal module 82 has a terminal seat 821 and a plurality of terminals 822. The terminal seat 821 is provided in the base body 811, the terminal seat 821 and the base body 811 are securely engaged together by a latching manner that a latching hook and a latching groove cooperate with each other. The plurality of terminals 822 are provided to the terminal seat 821 and the annular circumferential wall 812 of the insulative base 81 and are arranged to be spaced apart from each other. Each terminal 822 has a contact portion 823 which extends into the inserting groove 814.

The metal shell 83 sheathes the insulative base 81. The base body 811 of the insulative base 81 partially extends out of the metal shell 83, and the annular circumferential wall 812 is surrounded by the metal shell 83. A bottom portion of the metal shell 83 has a plurality of retaining pieces 831, each retaining piece 831 snaps in the corresponding retaining groove 813 by interfering cooperation, so that the metal shell 83 can be firmly fixed to the insulative base 81. A top portion of the metal shell 83 has a protruding piece 832, the protruding piece 832 is U-shaped and has a long piece body 833 and two short piece bodies 834. A length direction of the long piece body 833 extends along the second direction D2. The two short piece bodies 834 are respectively connected to opposite ends of the long piece body 833 and are spaced apart from each other along the second direction D2, each short piece body 834 is used to insert into the corresponding positioning space 123. The metal shell 83 is formed with two latching holes 835 which are spaced apart from each other along the second direction D2, each latching hole 835 is used to allow the corresponding latching block 621 to latch therewith. The metal shell 83 and the insulative base 81 together define a mating groove 84 which encircles the annular circumferential wall 812, the mating groove 84 is annular, is communicated with the two latching holes 835, and is used to allow the continuous surrounding wall 117 of the mating portion 111 and the two protruding portions 112 to insert therein.

Referring to FIG. 1, FIG. 2, FIG. 3 and FIG. 8, when the cable-end connector 101 is to be assembled to the board-end connector 102, firstly the circuit board 2 and the continuous surrounding wall 117 of the mating portion 111 are respectively aligned with the inserting groove 814 and the mating groove 84. Next, the cable-end connector 101 is moved downwardly along the third direction D3 and is moved toward the board-end connector 102. In a process that the cable-end connector 101 is moved downwardly, the circuit board 2 will firstly extend into the inserting groove 814, at the same time, the continuous surrounding wall 117 and the two protruding portions 112 will extend into the mating groove 84, and the annular circumferential wall 812 will extend into the inner cavity 118 via the second opening 119. Because the front end and the bottom end of each positioning space 123 are opened, the two short piece bodies 834 of the protruding piece 832 will subsequently extend into the two positioning spaces 123 respectively. The two latching blocks 621 of the locking member 6 will be squeezed by the long piece body 833 of the protruding piece 832, so as to make the locking segment 62 bend, deform and accumulate a restoring elastic force.

Because the top end of each positioning space 123 is closed, when the top end of each positioning space 123 is stopped by the corresponding short piece body 834, the cable-end connector 101 cannot be further moved downwardly, so that the cable-end connector 101 mates with the board-end connector 102. At this time, the circuit board 2 inserts into the inserting groove 814 and is electrically connected with the contact portions 823 of the plurality of terminals 822. The continuous surrounding wall 117 and the two protruding portions 112 insert into the mating groove 84. The annular circumferential wall 812 inserts into the inner cavity 118. Each short piece body 834 inserts into the corresponding positioning space 123. The locking segment 62 rebounds by means of the accumulated restoring elastic force, so that the locking member 6 converts to the locking state that the two latching blocks 621 respectively latch to the two latching holes 835.

By that the continuous surrounding wall 117 of the mating portion 111 inserts into the mating groove 84 and the inner cavity 118, which is formed by the continuous surrounding wall 117 and has an outer circumference thereof to be closed, allows the annular circumferential wall 812 to insert therein, an inner circumference and an outer circumference of the continuous surrounding wall 117 are respectively stopped and limited by the annular circumferential wall 812 and the metal shell 83. Therefore, it can prevent the continuous surrounding wall 117 from swaying or shaking along the first direction D1 or the second direction D2, so that the cable-end connector 101 can firmly mate with the board-end connector 102. Even if the plurality of cables 3 are strongly pulled due to inadvertent hit, the cable-end connector 101 does not easily generate a situation as swaying or shaking, so that stability of electrical signal transmission can be promoted. By that the two protruding portions 112 extends out from the front wall body 120, an area of an outer circumference of the insulative housing 1 which is stopped and limited by the metal shell 83 can be further increased, so as to promote mating firmness of the cable-end connector 101.

By that the circuit board 2 inserts into the inserting groove 814 formed by the annular circumferential wall 812, an outer circumference of the circuit board 2 will be stopped and limited by the annular circumferential wall 812. Therefore, it can prevent the circuit board 2 from swaying or shaking along the first direction D1 or the second direction D2, so as to further promote the mating firmness of the cable-end connector 101.

By that each positioning space 123 allows the corresponding short piece body 834 to insert therein, a left side and a right side of each short piece body 834 can function as stopping and limiting the insulative housing 1, so as to prevent the insulative housing 1 from swaying or shaking along the second direction D2. By that the rear end of each positioning space 123 is closed, a rear end of each short piece body 834 can function as stopping and limiting the insulative housing 1, so as to prevent the insulative housing 1 from swaying or shaking forwardly along the first direction D1. Therefore, the mating firmness of the cable-end connector 101 is further promoted.

By that the locking member 6 locks to the metal shell 83 and the top end of each positioning space 123 is closed, it can prevent the cable-end connector 101 from swaying or shaking along the third direction D3, so as to further promote the mating firmness of the cable-end connector 101.

Figure 10:
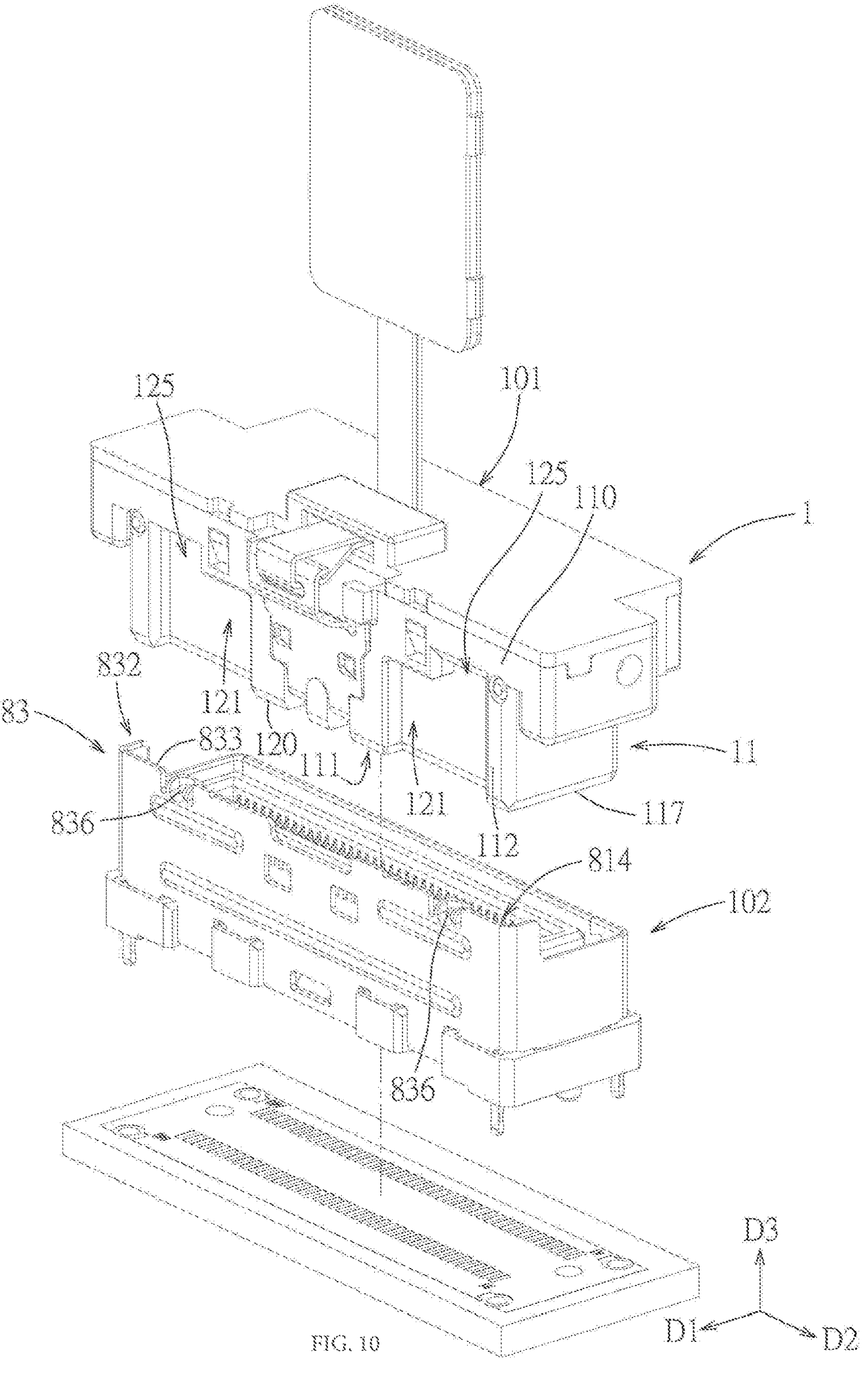
FIG. 10 is a perspective exploded view of a second embodiment of the electrical connection device of the present disclosure and the circuit board.

Referring to FIG. 10, a second embodiment of the electrical connection device 100 of the present disclosure is substantially the same as the first embodiment in entire structure, differs in the cable-end connector 101 of the insulative housing 1 and the metal shell 83 of the board-end connector 102.

Figure 11:
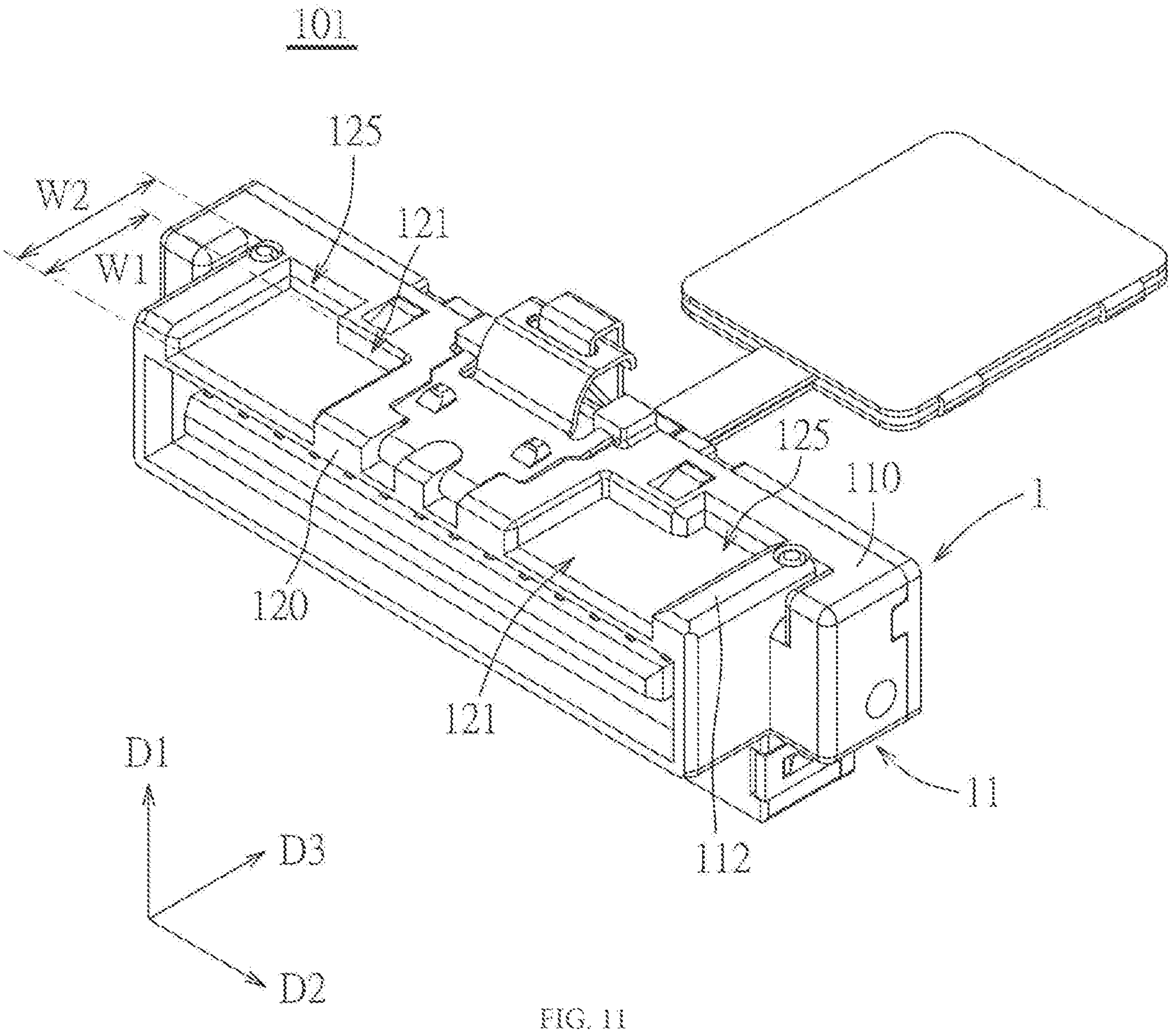
FIG. 11 is a perspective view of the cable-end connector of the second embodiment.

Referring to FIG. 10 and FIG. 11, the lower housing 11 of the insulative housing 1 is further formed with two receiving spaces 125 which extend from the front wall body 120 to the body portion 110 and are spaced apart from each other along the second direction D2. The two receiving spaces 125 are respectively communicated with outer sides of the two recessed portion 121. Each recessed portion 121 has a first extending length L1 taken along the third direction D3. Each receiving space 125 has a second extending length L2 taken along the third direction D3. The second extending length L2 is larger than the first extending length L1. Each protruding portion 112 is a solid structure. By that each protruding portion 112 is a solid structure, difficulty of manufacturing and molding the lower housing 11 can be lowered.

Figure 12:
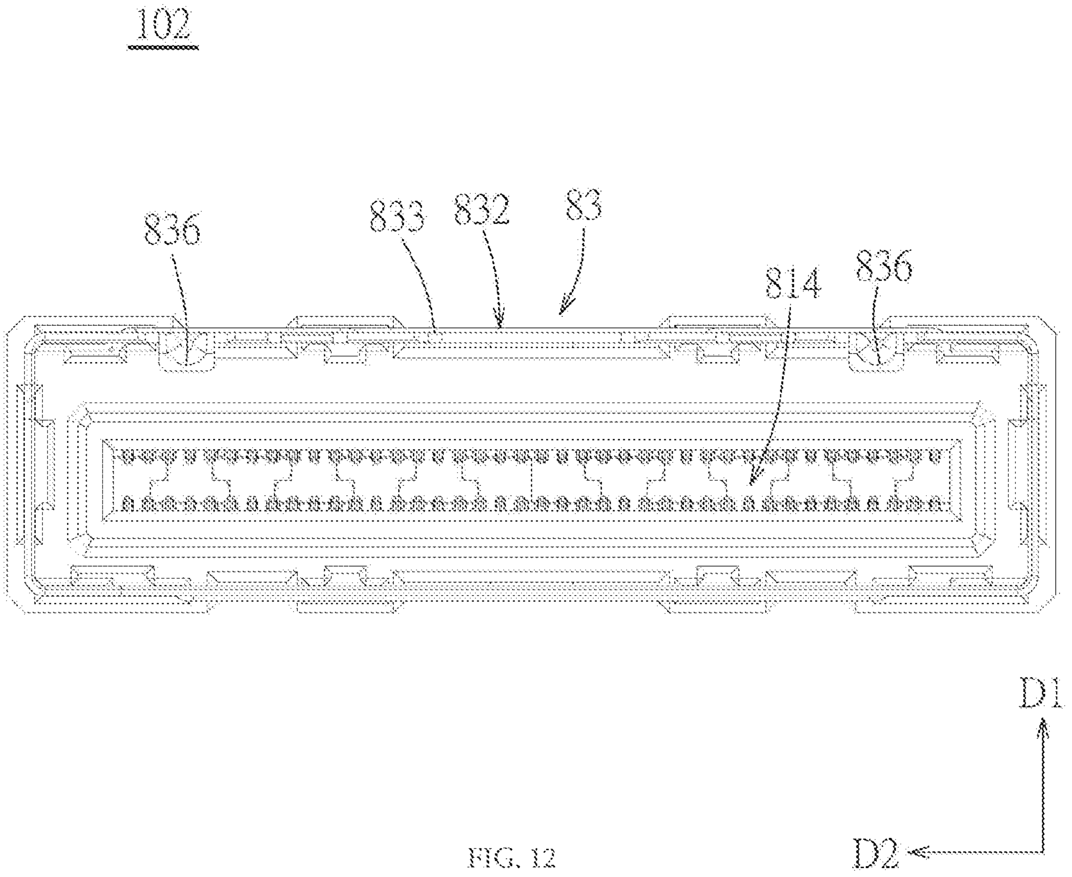
FIG. 12 is a top view of the board-end connector of the second embodiment.

Referring to FIG. 10 and FIG. 12, the protruding piece 832 of the metal shell 83 further has two preventing reverse insert components 836 which extend out from the long piece body 833. Each preventing reverse insert component 836 is a bent piece which bends and extends inwardly from the long piece body 833 toward the inserting groove 814. Each preventing reverse insert component 836 is used to stop and push away the continuous surrounding wall 117 of the mating portion 111 of the cable-end connector 101, so as to prevent the circuit board 2 of the cable-end connector 101 (as shown in FIG. 11) from inserting into the inserting groove 814 of the board-end connector 102.

Figure 13:
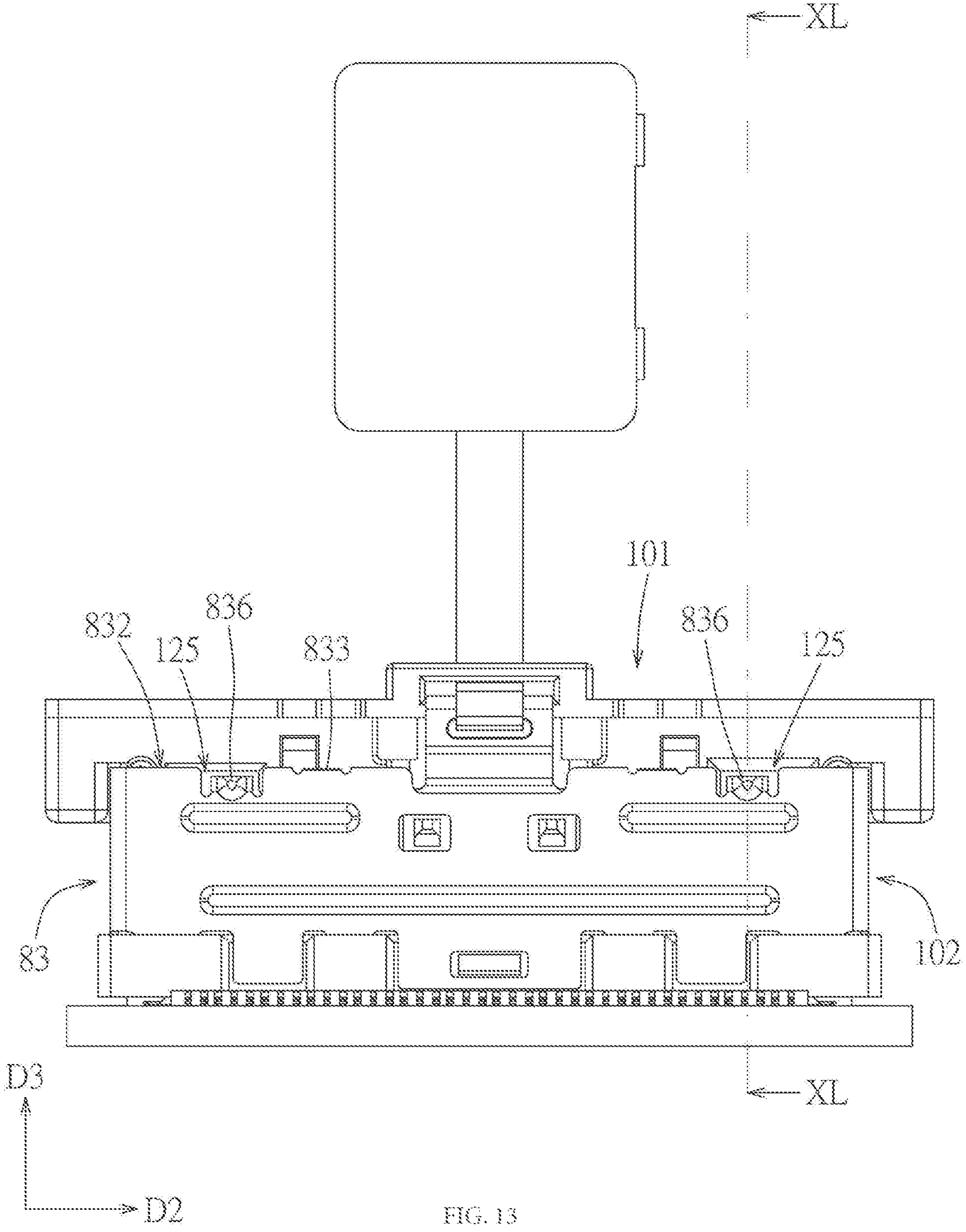
FIG. 13 is a front view of the second embodiment and the circuit board.
Figure 14:
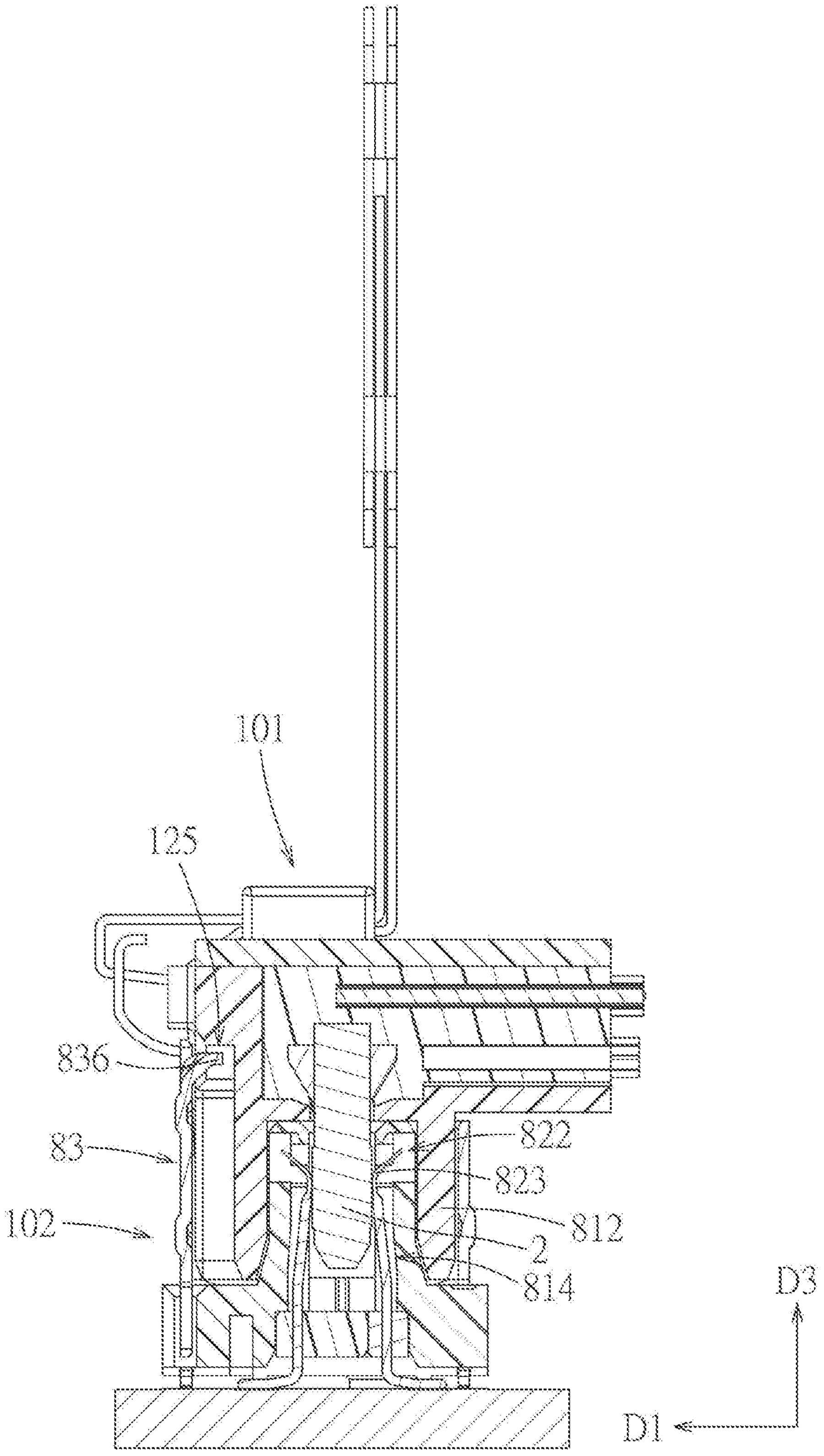
FIG. 14 is a cross sectional view taken along a line XL-XL of FIG. 13 illustrating that the cable-end connector properly inserts into the board-end connector.

Referring to FIG. 11, FIG. 13 and FIG. 14, by that the second extending length L2 of each receiving space 125 is larger than the first extending length L1 of each recessed portion 121, each receiving space 125 can match with a height position of the corresponding preventing reverse insert component 836 and receives the corresponding preventing reverse insert component 836 when the cable-end connector 101 properly inserts. When the cable-end connector 101 properly inserts into the board-end connector 102, the two preventing reverse insert component 836 are respectively received in the two receiving spaces 125. Therefore, the two preventing reverse insert component 836 do not block the insulative housing 1 and in turn do not affect an assembling process that the cable-end connector 101 mates with the board-end connector 102.

Figure 15:
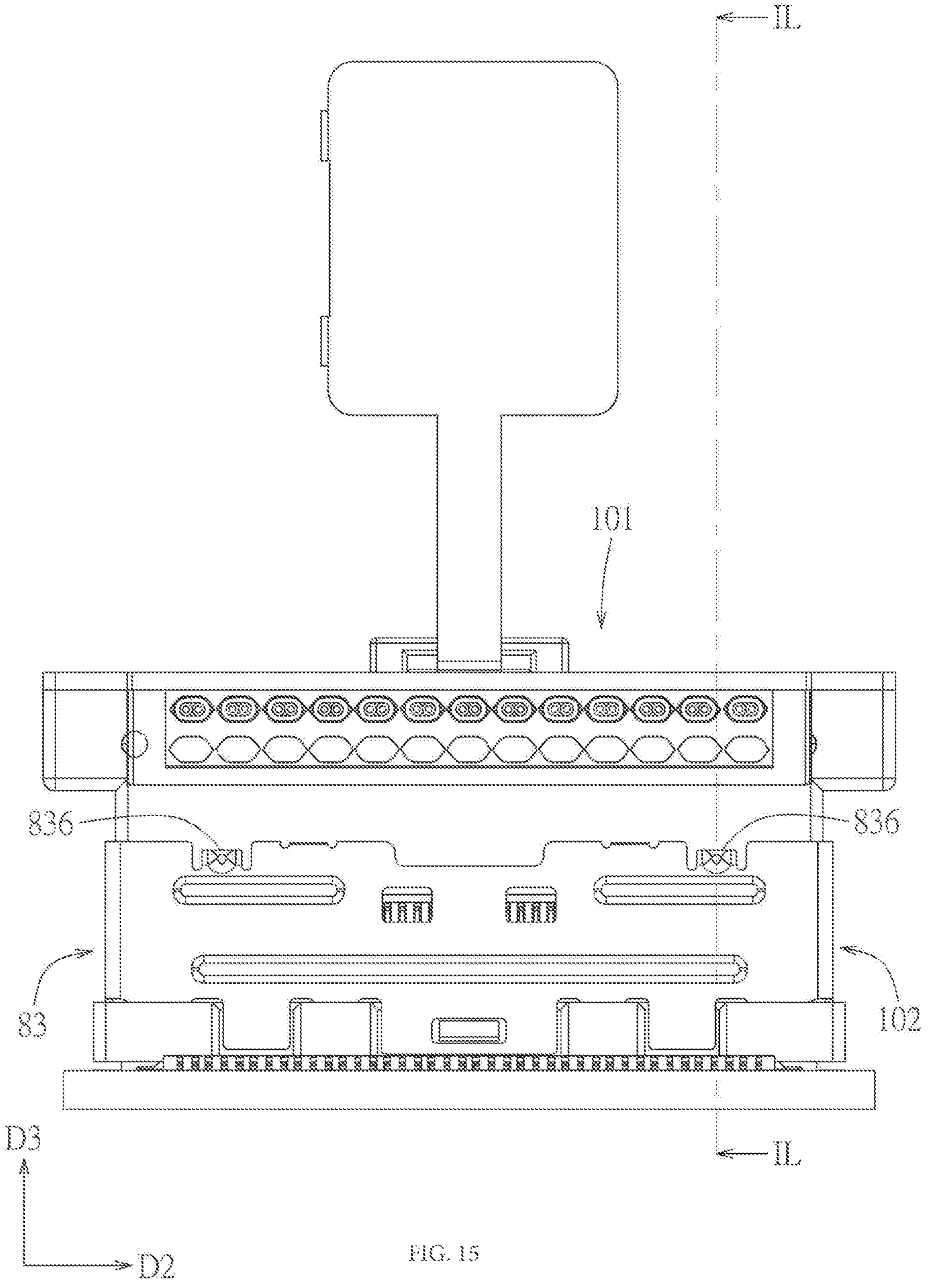
FIG. 15 is a front view of the second embodiment and the circuit board.
Figure 16:
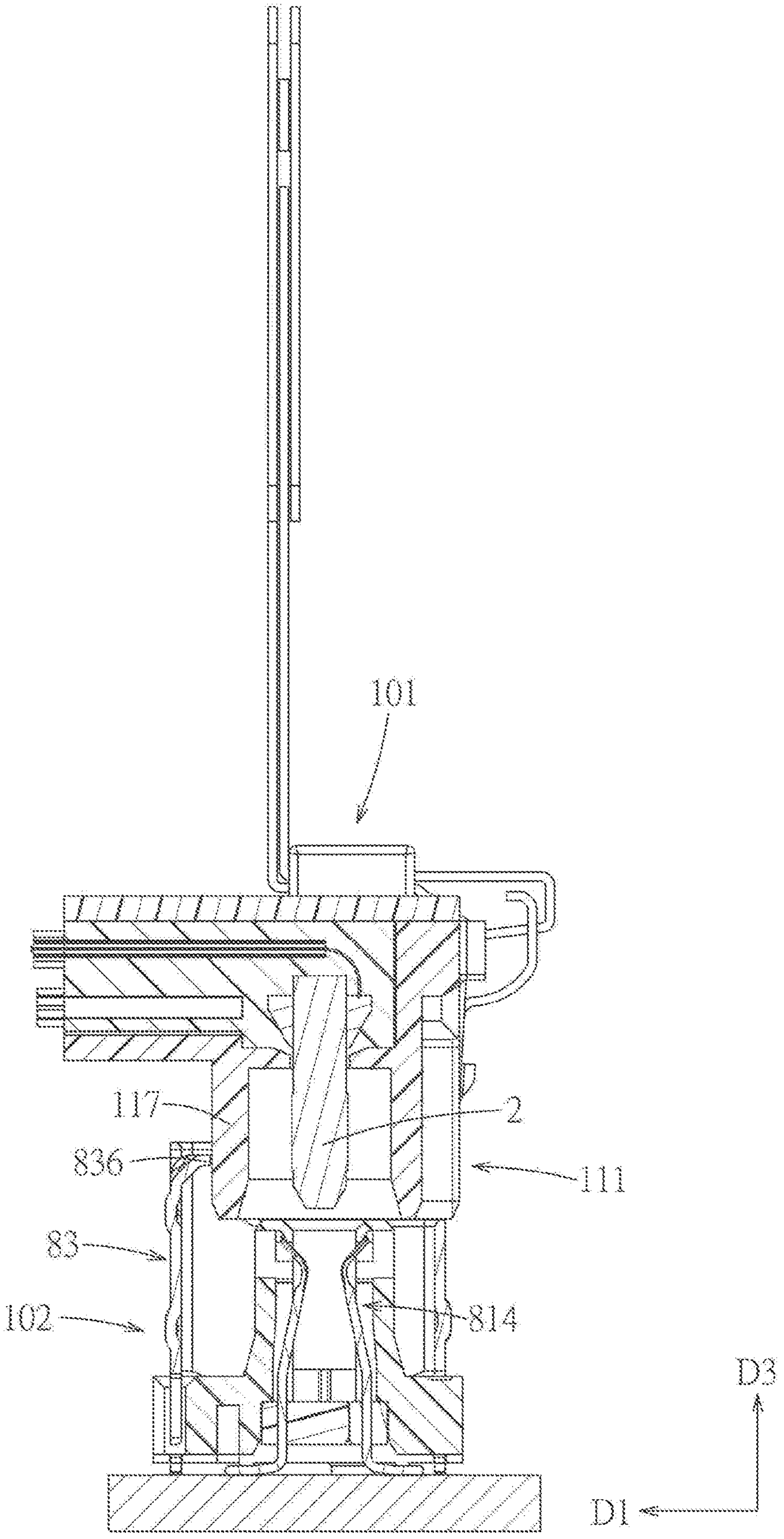
FIG. 16 is a cross sectional view taken along a line IL-IL of FIG. 15 illustrating that the cable-end connector reversely inserts into the board-end connector.

Referring to FIG. 15 and FIG. 16, when the cable-end connector 101 is rotated by 180 degrees and then is moved downwardly along the third direction D3 and is reversely inserted into the board-end connector 102, the two preventing reverse insert component 836 will firstly contact and stop the continuous surrounding wall 117 of the mating portion 111, subsequently push away the continuous surrounding wall 117 rearwardly, so that the cable-end connector 101 is blocked by the metal shell 83 and cannot further moved downwardly, so as to prevent the circuit board 2 from inserting into the inserting groove 814. Therefore, it can attain an effect of preventing a user from wrongly and reversely inserting the cable-end connector 101.

By that the two preventing reverse insert component 836 are two in number, besides an area contacting the continuous surrounding wall 117 can be increased to promote the stopping effect, it further can attain an effect of uniformly stopping the continuous surrounding wall 117 so as to prevent the continuous surrounding wall 117 from skewing. Certainly, the receiving space 125 and the preventing reverse insert component 836 of the second embodiment also may be set as one in number as desired, are not limited two in number.

In conclusion, in the electrical connection device 100 of each embodiment, by that the continuous surrounding wall 117 of the mating portion 111 inserts into the mating groove 84 and the inner cavity 118, which is formed by the continuous surrounding wall 117 and has an outer circumference thereof to be closed, allows the annular circumferential wall 812 to insert therein, an inner circumference and an outer circumference of the continuous surrounding wall 117 are respectively stopped and limited by the annular circumferential wall 812 and the metal shell 83. By that each positioning space 123 allows the corresponding short piece body 834 to insert therein, each short piece body 834 can function as stopping and limiting the insulative housing 1. Therefore, it can prevent the insulative housing 1 from swaying or shaking along the first direction D1 or the second direction D2, so that the cable-end connector 101 can firmly mate with the board-end connector 102. Even if the plurality of cables 3 are strongly pulled due to inadvertent hit, the cable-end connector 101 does not easily generate a situation as swaying or shaking, so that stability of electrical signal transmission can be promoted. So it indeed can attain the object of the present disclosure.

However, the above description is only for the embodiments of the present disclosure, and it is not intended to limit the implementing scope of the present disclosure, and the simple equivalent changes and modifications made according to the claims and the contents of the specification are still included in the scope of the present disclosure.

What is claimed is:

1. An electrical connection device, comprising:
a cable-end connector comprising:
an insulative housing having a body portion and a mating portion, the body portion being formed with a first opening, the mating portion being connected to the body portion and having a continuous surrounding wall which encircles the first opening, the continuous surrounding wall encircles to form an inner cavity, the inner cavity having a second opening, each of two opposite sides of the body portion and the mating portion therebetween forming a positioning space;
a circuit board provided to the body portion, partially extending out of the first opening and extending to the inner cavity;
at least one cable electrically connected to a side of the circuit board; and
a locking member provided to the insulative housing.

2. The electrical connection device of claim 1, wherein the positioning space is a positioning groove,
a front end and a bottom end of the positioning groove are opened, a rear end and a top end of the positioning groove are closed.

3. The electrical connection device of claim 1, wherein the continuous surrounding wall has a front wall body,
the insulative housing further has two protruding portions which extend forwardly from the front wall body and are respectively adjacent to two opposite sides of the continuous surrounding wall.

4. The electrical connection device of claim 3, wherein each protruding portion is formed with an opened groove which is communicated with the inner cavity and extends to the second opening.

5. The electrical connection device of claim 3, wherein each protruding portion is a solid structure.

6. The electrical connection device of claim 3, wherein the front wall body formed with two recessed portions which extend toward the body portion,
each recessed portion is interposed between the corresponding protruding portion and the locking member.

7. The electrical connection device of claim 6, wherein the insulative housing is formed with two receiving spaces which extend from the front wall body to the body portion,
the two receiving spaces are respectively communicated with outer sides of the two recessed portions.

8. The electrical connection device of claim 7, wherein each recessed portion has a first extending length,
each receiving space has a second extending length,
the second extending length is larger than the first extending length.

9. The electrical connection device of claim 1, wherein the cable-end connector further comprises a cladding body which is positioned in the insulative housing,
the cladding body clads a region where the circuit board and the cable are connected with each other.

10. The electrical connection device of claim 9, wherein the cable-end connector comprises a plurality of cables which are electrically connected to two opposite sides of the circuit board respectively,
the insulative housing is formed with an injecting hole,
the cladding body is formed by that a plastic is injected into the insulative housing via the injecting hole and is filled in the insulative housing.

11. The electrical connection device of claim 10, wherein the insulative housing is formed with a molding cavity which receives the cladding body and is communicated with the injecting hole and a retaining hole which is communicated with the molding cavity,
the cable-end connector further comprises a retaining member, the retaining member is partially provided in the retaining hole, partially extends into the molding cavity and is securely engaged with the cladding body.

12. The electrical connection device of claim 1, wherein the insulative housing formed with a retaining groove,
the locking member has a retaining segment which is provided to the retaining groove, a locking segment which extends out from the retaining segment and is spaced apart from the insulative housing, and an actuating segment which extends out from the locking segment.

13. The electrical connection device of claim 12, wherein the cable-end connector further comprises a pulling strap,
the pulling strap has a connecting strap body which is connected to the actuating segment of the locking member and a grasping strap body.

14. The electrical connection device of claim 1, wherein the electrical connection device further comprises a board-end connector,
the board-end connector comprises an insulative base, a plurality of terminals and a metal shell, the insulative base has an annular circumferential wall which is used to insert into the inner cavity, the annular circumferential wall is formed with an inserting groove which is used to allow the circuit board to insert therein, each terminal is provided to the insulative base and has a contact portion which extends into the inserting groove and is used to be electrically connected with the circuit board, the metal shell sheathes the insulative base, is used to allow the locking member to lock therewith and is used to insert into the corresponding positioning space, the metal shell and the insulative base together define a mating groove which encircles the annular circumferential wall and is used to allow the continuous surrounding wall to insert therein.

15. The electrical connection device of claim 14, wherein a top portion of the metal shell has a protruding piece, the protruding piece is U-shaped and has a long piece body and two short piece bodies which are respectively connected to opposite sides of the long piece body, each short piece body is used to insert into the corresponding positioning space.

16. The electrical connection device of claim 1, wherein the electrical connection device further comprises a board-end connector, the board-end connector comprises an insulative base, a plurality of terminals and a metal shell, the insulative base formed with an inserting groove which is used to allow the circuit board to insert therein, each terminal is provided to the insulative base and has a contact portion which extends into the inserting groove and is used to be electrically connected with the circuit board, the metal shell sheathes the insulative base and is used to allow the locking member to lock therewith, a top portion of the metal shell has a protruding piece, the protruding piece is U-shaped and has a long piece body and two short piece bodies which are respectively connected to opposite sides of the long piece body, each short piece body is used to insert into the corresponding positioning space.

17. The electrical connection device of claim 16, wherein the insulative base has a base body which partially extends out of the metal shell, the base body is formed with a retaining groove, a bottom portion of the metal shell has a retaining piece which snaps into the retaining groove of the base body.

18. The electrical connection device of claim 15, wherein the protruding piece further has at least one preventing reverse insert component which extends out from the long piece body, when the cable-end connector reversely inserts into the board-end connector, the preventing reverse insert component of the board-end connector will stop and push away the continuous surrounding wall of the mating portion, so as to prevent the circuit board from inserting into the inserting groove.

19. The electrical connection device of claim 18, wherein the preventing reverse insert component is a bent piece which bends and extends inwardly from the long piece body toward the inserting groove.

20. The electrical connection device of claim 18, wherein the insulative housing is formed with at least one receiving space which is used to receive the preventing reverse insert component, when the cable-end connector properly inserts into the board-end connector, the preventing reverse insert component is received in the receiving space.

21. The electrical connection device of claim 20, wherein the protruding piece has two preventing reverse insert components which extend out from the long piece body and are spaced apart from each other, the insulative housing is formed with two receiving spaces which are respectively used to receive the two preventing reverse insert components.

22. The electrical connection device of claim 1, wherein the insulative housing has a lower housing and an upper housing which is assembled to the lower housing, the lower housing has the body portion and the mating portion.

* * * * *